(No Model.)

W. S. SIMS.
METHOD OF COILING ROPES, &c., AND PREVENTING TWISTING OR KINKING THEREOF WHILE BEING PAID FROM A COIL.

No. 374,209. Patented Dec. 6, 1887.

Witnesses:
Henry P. Butler.
Frederic M. Dean.

Inventor:
Winfield S. Sims

UNITED STATES PATENT OFFICE.

WINFIELD S. SIMS, OF NEWARK, NEW JERSEY.

METHOD OF COILING ROPES, &c., AND PREVENTING TWISTING OR KINKING THEREOF WHILE BEING PAID FROM A COIL.

SPECIFICATION forming part of Letters Patent No. 374,209, dated December 6, 1887.

Application filed June 14, 1882. Serial No. 64,193. (No model.)

*To all whom it may concern:*

Be it known that I, WINFIELD S. SIMS, of Newark, in the county of Essex and State of New Jersey, have invented a new and Improved Method of Coiling Ropes, &c., and Preventing Twisting or Kinking Thereof while being Paid from a Coil, of which the following is a specification.

As is well known, when a rope or cable is drawn from a stationary coil, reel, or drum, the rope or cable is liable to twist and kink.

My invention consists in the method, herein described, of preventing the twisting or kinking of the rope or cable when being paid off from a coil or reel which does not rotate on its axis.

My method is as follows: I impart to the rope or cable a twist, and while so twisting wind it into a coil or upon a reel, from which it is intended to be uncoiled when used by being drawn from it or out of its center, substantially in the direction of the axis of the coil, while the coil or reel as a whole remains at rest and is not reversely rotated. The rope should receive one complete twist upon itself in each length around the coil. When the rope is thus twisted and coiled, the twist will remain until the rope is uncoiled, and when unwound by being drawn off from or out of the coil, without allowing the coil itself to revolve, the twist imparted by such unwinding will accomplish the reversal of the twist imparted during the operation of coiling, and the rope so drawn out will be free from all twist or kink.

I will now proceed to describe an apparatus by which the above-described operation of twisting and coiling of the rope may be accomplished.

Figure 1:
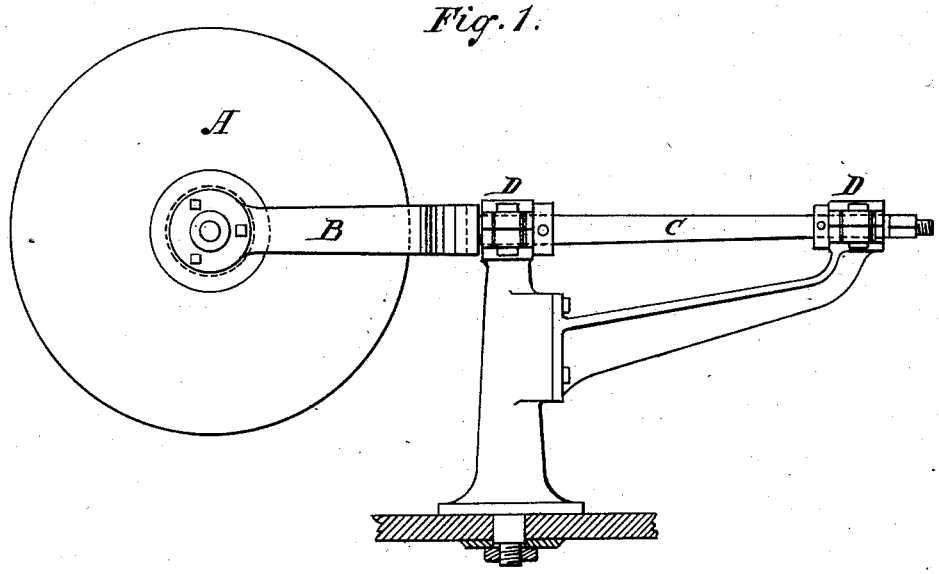
Figure 2:
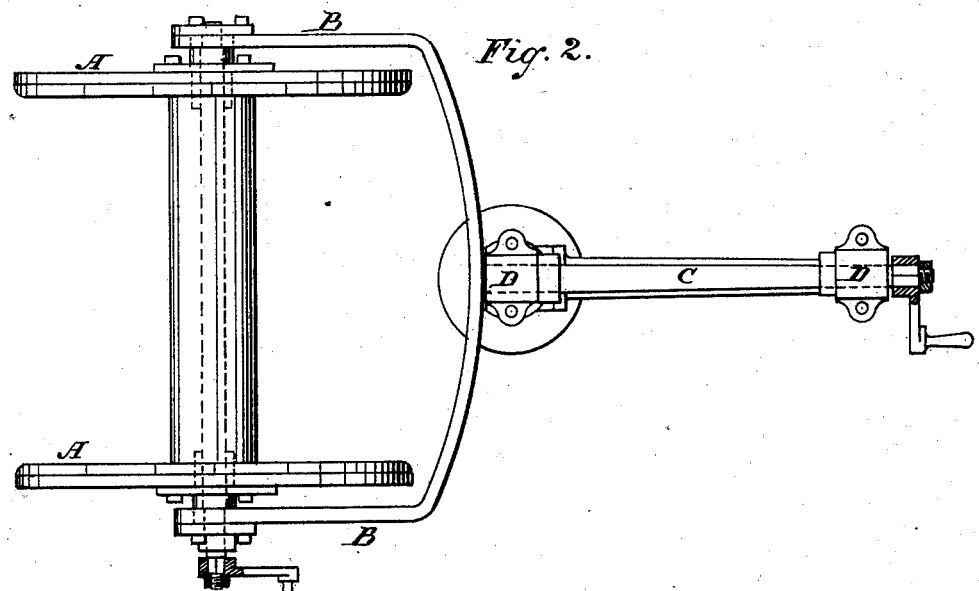

Figure 1 is a side view of a machine for twisting the rope or cable. Fig. 2 is a top view of the same.

For the purpose of so twisting the rope or cable I employ the following device. I wind or place the rope on a reel or barrel suspended in such wise upon a revoluble frame that the reel or barrel may freely revolve upon its own axis, and the respective axes of revolution of the reel or barrel and the frame shall be at right angles to each other. It will thus be seen that by revolving the frame while the rope is being unwound from the reel a twist is imparted to it. Now, by coiling the rope, or taking it up upon another reel, as it is being unwound from the reel suspended in the frame, the twist may be retained until released by being paid out; and when the revolutions of the receiving or coiling reel are made coincident with the revolutions of the frame the rope will pay out without twist or kink.

I have not deemed it necessary to show the receiving or coiling reel in the drawings, as it is obvious that this may be made and operated independently of the twisting-machine, and any form of reel capable of being revolved and suitably placed will be sufficient for the purpose specified.

The reel suspended in the frame may be a fixture therein or be detachable therefrom, as convenience in reeling or otherwise may suggest.

Figs. 1 and 2 show a form of my machine for twisting the rope or cable and a mode of constructing the frame. In this machine the arms B B constitute the frame, and project from one end of the rotating shaft C. At the extremities of these arms I suspend the reel A. The shaft is suitably supported upon the journal-bearings D D. Thus the rope may be freely drawn off from the reel or barrel A while it is being twisted by the revolution of the shaft C.

Any other device may be employed which shall give a rotary motion to the frame or supports of the reel or barrel and at the same time permit the rope to freely unwind while the twist is being imparted to it, as described; or the above operation may be reversed and the twist be imparted by taking up or coiling the rope upon the reel or barrel supported in the frame while the frame is being revolved.

My invention is especially valuable when applied to electrical cables, to be used for operating torpedo-boats or submarine vessels, this liability to twist or kink increasing the hazard of fouling or breaking.

Having thus described my invention, what

I claim, and desire to secure by Letters Patent, is—

The described method of coiling ropes, &c., and preventing twisting or kinking thereof while being paid from a coil, consisting in winding said rope, hawser, or cable to form the coil and simultaneously with the winding imparting a twist thereto, whereby one complete turn is imparted in the length of each complete round of the coil, as described.

WINFIELD S. SIMS.

Witnesses:
HENRY P. BUTLER,
FREDERICK DEAN.